UNITED STATES PATENT OFFICE.

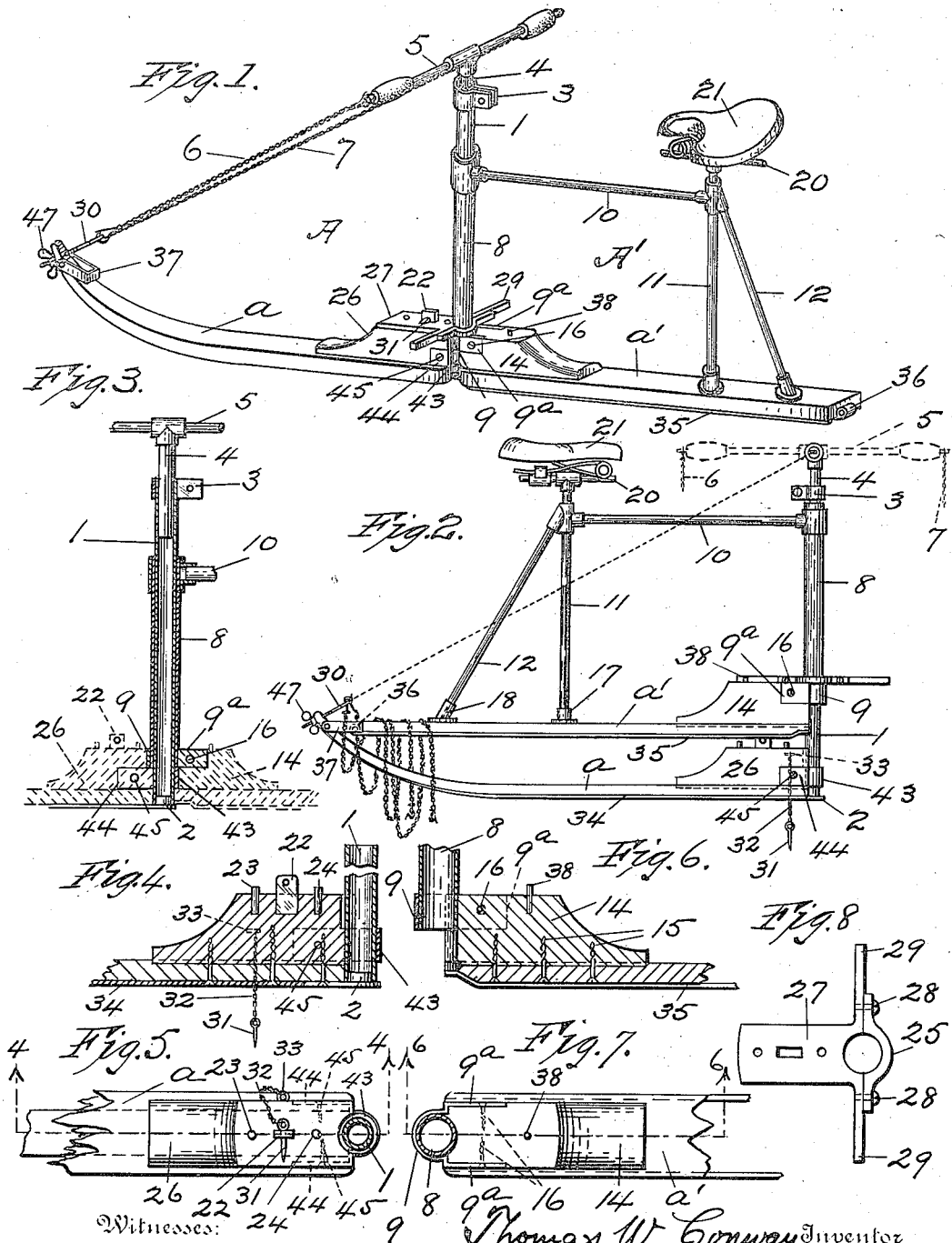

THOMAS W. CONWAY, OF NORTH BERGEN, NEW JERSEY, ASSIGNOR OF ONE-HALF TO ROY S. POLLOCK.

COASTING-SLEIGH.

1,142,799.  Specification of Letters Patent.  Patented June 15, 1915.

Application filed June 19, 1914. Serial No. 846,120.

*To all whom it may concern:*

Be it known that I, THOMAS W. CONWAY, a citizen of the United States, and a resident of North Bergen, county of Hudson, and State of New Jersey, have invented certain new and useful Improvements in Coasting-Sleighs, of which the following is a full and exact specification, reference being had to the accompanying drawings, wherein—

Figure 1 is a perspective view of a coasting sleigh constructed according to my invention; Fig. 2 a side elevation thereof in folded condition; Figs. 3 to 8 are details; Fig. 3 a sectional view through the steering or pivot post, and the front upright of the saddle frame, rotatably mounted thereon; Fig. 4 a sectional view on lines 4—4 indicated in Fig. 5; Fig. 5 a plan view of the rear end of the forward section of the runner; Fig. 6 a sectional view on lines 6—6 indicated in Fig. 7; Fig. 7 a plan view of the forward end of the rear section of the runner; and Fig. 8 a plan view of the brace and foot rests for the rider.

This invention relates to sleighs and consists of a single runner sleigh, or coaster, composed of two frames, the bases of which constitute the single runner, and in which the rear upright member of the forward frame and the front upright member of the rearward frame are combined to form a pivot, whereby the two frames are joined together, and so that the two sections of the runner may be maintained in line, as shown in Fig. 1, to cause the sleigh to run in straight line, or by an appropriate action upon the handle bar brought into an angular position relatively to each other for the purpose of steering the sleigh, deflecting the forward section into an angular position relatively to the rear, to deviate from a straight line course.

The construction of my improved coaster sleigh is also devised with the object in view of enabling the two component frames thereof to be folded upon each other, as shown in Fig. 2, when it is not in use, to facilitate its more convenient transportation.

In the embodiment of my invention, illustrated in the drawings, A is the front or steering frame, and A' the rear or saddle frame of the coaster sleigh. The front frame is made up of the base $a$, the post 1, the handle bar 5, having its dependent arm 4 set in the upper end of post 1, and secured in adjusted position by the clamp 3, and of the chains or cables 6 and 7, connecting the ends of the handle bar with the upwardly bent front end of the base $a$. The rear frame A' is composed of the base member $a'$, the tubular upright member 8, the upright 11, the connecting member 10, and the brace 12. The base members $a$ and $a'$ of the two frames A and A' constitute the single runner of the sleigh.

The post 1, forming the rear upright member of the forward frame A, is made preferably of a tube; its lower end is brazed to a socket, provided on, or made integral with, the heel 2 firmly secured to the rear end of the base member $a$. In addition thereto a brace comprising a band 43 extended into wings 44 is brazed to the lower end of post 1 and the wings 44 secured by screws or bolts 45 to the block 26, which is firmly secured to the rear end of the base member $a$ or made of one piece therewith.

The chains or cables 6 and 7, connecting the ends of the handle bar 5 to the front end of the base member $a$, are connected to the screw-eye 30, which is adjusted by screwing on the thumb nut 47 fitted on its end, to obtain the necessary rigidity of the frame by drawing taut the chains.

For the purpose of safely securing the forward upright member 8 of the rear frame A' to its base $a'$, the band 9 is brazed to its lower end, and its wings 9ª are secured by screws or bolts 16 to a suitably shaped block 14, which is firmly secured to the forward end of the base member $a'$, as for instance, by being fitted into a dovetailed recess in, and secured thereto by screws 15. The block 14 and the base member $a'$ may also be produced of one piece.

The upright member 11 of the rear frame A' serves as a seat or saddle post, the cross-rod 20 being secured thereto, and the saddle 21, or some other seat, being mounted thereon in the usual way. The lower ends of the upright 11, and of the brace 12, are rigidly secured in the base member $a'$ by being brazed to the sockets 17 and 18 respectively, which are firmly secured therein. The connecting member 10, and the upper end of brace 12, are secured to the upright members 8 and 11 by suitably shaped fittings, which may be brazed thereto. The staple 22, and the pins 23 and 24, are set in the block 26 in position to engage corresponding apertures in the T-shaped piece 27 when set thereon. This T-shaped piece 27, whose lateral extensions 29 project to both sides therefrom, and form supports for the feet of the person riding on the sleigh, is secured to the block 26 by inserting the bolt 31 into the staple 22. To avoid losing of this bolt, if it should happen to be dislodged by the vibrations or jerks in the travel of the sleigh over rough surfaces, the same is attached, by the chain 32, to a screw-eye 33, screwed in the block. The central portion of the T-shaped piece 27 is recessed to fit upon the upright member 8 of the rear frame, which is inclosed therein by the arch 25, joined to the T-shaped piece 27 by screw-bolts 28, whereby the feet supports 29 are additionally secured against lateral displacement, this arrangement also permitting the rider to assist, with his feet, in steering the sleigh.

Metallic shoes 34 and 35, preferably of semi-circular cross-sectional form, are affixed, one to each of the base members $a$ and $a'$. The rear end of the shoe 35 is rolled to form a bolt 36, which engages with the lug 37, pivoted to the up-bent front end of the base member $a$ of the forward frame, when the sleigh is folded for transportation as shown in Fig. 2.

The folding of the sleigh is proceeded with as follows: The bolt 31 is withdrawn from the staple 22 to permit the raising of the rear frame above the block 26, then the cables 6 and 7 are disconnected from the ends of the handle bar, and the rear frame is swung around on post 1, and brought into the position shown in Fig. 2. By this turn the bolt 36 at the rear end of its base $a'$ is brought in position to be engaged by the lug 37, which is raised and then dropped onto the bolt 36. Thus the rear frame is secured in its folded position upon the front frame; the chains, or cables 6 and 7 may then be wound around the base members of both frames to hold them more securely together. Lastly the T-shaped piece 27 is turned into the position shown in Fig. 2, one of the foot supports 29 then abutting against the pin 38, set in the block 14, whereby it is held in this position. If it is desired, the handle bar 5 may be turned into the position indicated in dotted lines in Fig. 2. To do so the clamp 3 is loosened and tightened up again after the handle bar is so turned.

This completes the folding operation, all parts of the coaster sleigh are then in the same plane, whereby the space, required for storing or transporting it is reduced.

I claim as my invention:

1. A single runner sled comprising two pivotally connected frames, the bases whereof constitute the single runner, the forward member of the rearward frame forming a tubular bearing, and the rear upright member of the forward frame the pivot journaled therein, and thus connecting the frames; means for holding the frames in alinement, and for angularly deflecting the forward frame, mounted on the pivot, and a support for the rider, mounted on the rear frame; substantially as herein shown and described.

2. A single runner sled comprising a front and a rear section, a block secured to the front end of the rear section; a tubular upright, having its lower end secured to the block at the front end of the rear section, a steering post set therein and having its lower end secured to the rear end of the front section, a handle bar, fitted to the upper end of the steering post, and means connecting the handle bar with the front end of the forward section; substantially as herein shown and described.

3. A single runner folding sled comprising pivotally connected front and rear runner sections, a steering post tube, and a seat post, mounted upon the rear runner section, a brace between the upper ends of the steering post tube and the seat post, and a brace between the seat post and the rear runner section; a steering post set in the steering post tube, and connected at its lower end with the rear end of the front runner section; a handle bar on the upper end of the steering post, means connecting the ends of the handle bar with the forward end of the front runner section, a seat mounted upon the seat post tube, and foot supports on the rear part of the front runner section; substantially as herein shown and described.

4. A single runner sled, comprising two pivotally connected sections, the front runner section having its forward end upwardly curved, a loop pivotally connected thereto and an extension at the rear end of the rear runner section, adapted to engage with the loop when the runner sections are turned to overlie each other; substantially as herein shown and described.

THOMAS W. CONWAY.

Witnesses:
WILLIAM L. TUFTS,
LOUISE KELLER.